United States Patent Office 3,356,563
Patented Dec. 5, 1967

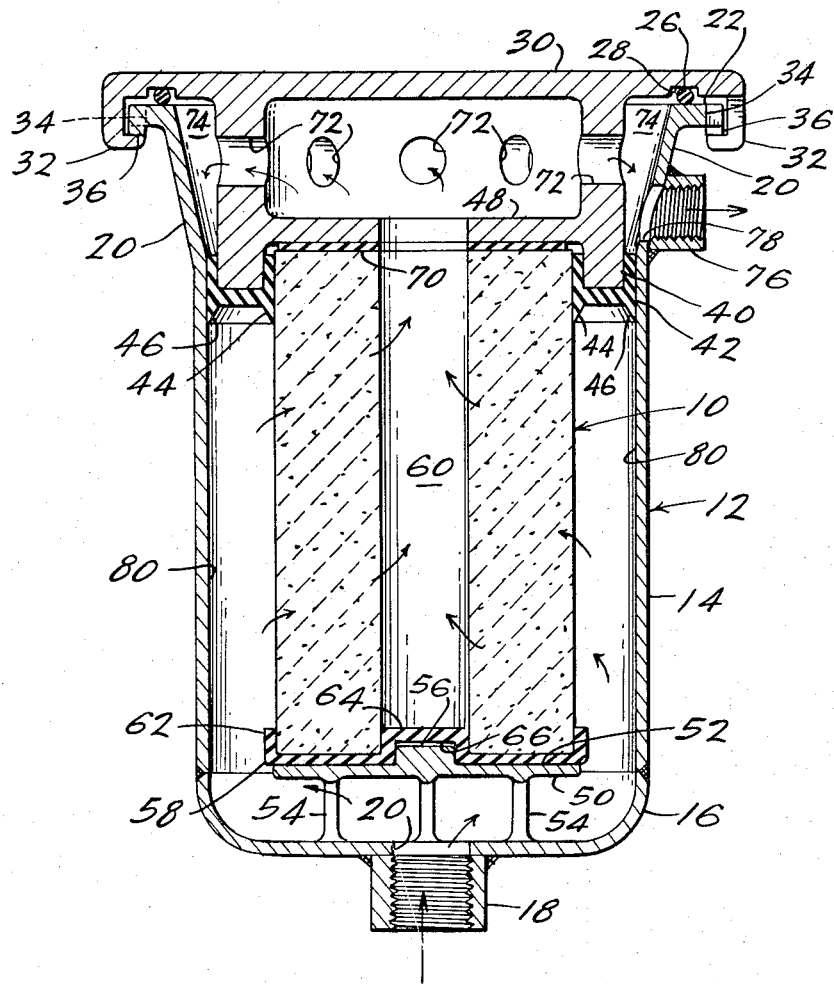

3,356,563
METHOD FOR THE PREPARATION OF
SILICA FIBERS
Alfred Marzocchi, Cumberland, R.I., assignor to Owens-Corning Fiberglas Corporation, a corporation of Delaware
Filed Feb. 21, 1967, Ser. No. 632,126
9 Claims. (Cl. 161—170)

ABSTRACT OF THE DISCLOSURE

A method of making a coiled package of leached glass fibers without the use of protective film forming materials and without breakage during gathering, coiling, and firing by wetting the filaments with water at forming, controlling the speed, tension, and crossover angle to prevent breakage and then subjecting the package to leaching, washing, and firing.

Cross references to related applications

The present application is a continuation in part of my copending application 514,458, filed Dec. 17, 1965, and now abandoned, which in turn is a continuation in part of the then copending application, Ser. No. 247,309, filed Dec. 26, 1962, and now abandoned.

Background of the invention

The present invention relates to methods for the preparation of siliceous fibers, and the products derived from such methods, and particularly to high temperature, continuous silica fibers which are derived from glass fibers.

Recently, an increasing demand for insulating and/or reinforcing materials which will withstand extreme temperature conditions, has resulted in the widespread utilization of silica fibers. These fibers will endure temperatures ranging from $-300°$ F. to $+3000°$ F. and are versatile in their adaptability to employment as fabrics, roving or chopped fibers employed in a continuous matrix.

At present, the only practical method for the preparation of continuous silica fibers comprises the leaching of conventional glass fibers to preferentially remove the non-siliceous components of such fibers and leave a network which is substantially pure silica. Specifically, the fibers are treated with a leaching agent which preferentially removes the mono-, di-, and trivalent glass forming metal oxide constituents, without affecting the silica component. As a result of such treatment, the fiber after leaching, may comprise as much as 99.9 percent by weight of silica. After leaching the silica fibers are washed to remove leached residues such as residual acids and salts, and heat treated or tempered to improve their strengths, which are greatly diminished by the leaching. In addition, such treatment results in an open gel structure, which on its collapse during firing of the fibers, produces extensive shrinkage of the fibers. Such methods for the preparation of silica fibers from glass fibers are fully disclosed by U.S. Patents 2,215,039, 2,221,709, 2,461,841, 2,500,092, 2,624,658, 2,635,390, 2,686,954, 2,718,461, and 2,730,475.

It is apparent that the described leaching entails extensive processing and consequent expense. In addition, the shrinkage caused by the leaching treatment may amount to as much as 20 percent or more. Such shrinkage is particularly detrimental in the case of silica fiber fabrics since the fibers are leached after weaving and the undesirable consequences of shrinkage of the fabric are readily apparent. Even in the case of fibrous mats, the present leaching techniques are impaired by the fact that leaching also removes the binder which imparts integrity to the mat, and as a result, the mat must be bonded twice, i.e. before and after leaching.

Accordingly, many end uses have been precluded by the present necessity for expensive processing in the preparation of silica fibers, or the complete inability of present methods to provide a satisfactory product, e.g. a fabric which will not undergo shrinkage as a result of the leaching step.

It should be noted that continuous silica fibers cannot presently be produced in a practical and economical method such as that employed in the production of glass fibers because of large changes in viscosity of pure silica upon small changes in temperature at or near the melting point of silica. This arises from the fact that prohibitive melting temperatures of an all silica batch, and the lower strengths of silica fibers, are not conducive or susceptible to a continuous attenuation technique such as those which are utilized in forming glass fibers.

Summary of the invention

According to the invention, it has been discovered that it is possible to leach fibers completely and uniformly while in a coiled package provided: the fibers which are coiled into the package are devoid of film former such as starch or other plastc resinous materials, and provided the fibers are coiled into an open package using low tensions and high cross over angles. Because of the limitations of all known commercial glass fiber forming machinery, it is necessary to operate conventional machinery at approximately ½ of their normal operating speed of approximately 10,000 feet per minute in order that the desired high cross over angle can be achieved in the coiled package.

It is an object of the present invention to provide new and unusual methods for the preparation of silica fibers.

Another object is the provision of a method for the concurrent formation of glass fibers, and the transformation of such fibers to silica fibers.

A further object is the provision of a method for the conversion of glass fibers into silica fibers.

An additional object is the provision of metallosilica continuous fibers.

The foregoing objects are achieved by means of the acidic treatment of glass fibers during their formation by attenuation. The attainment of another embodiment of the invention, i.e. the preparation of metallo-silica continuous fibers, is accomplished by the post-treatment or impregnation of the derived silica fibers with metal ions or gaseous metals.

Brief description of the drawing

The solitary figure of the drawings is a longitudinal cross-sectional view through an absorption unit utilizing a cartridge of surface active material produced in accordance with the present invention.

Description of the preferred embodiments

The processes of the invention are aptly illustrated by subsequent flow diagrams, the first of which depicts the method of preparing the silica fibers:

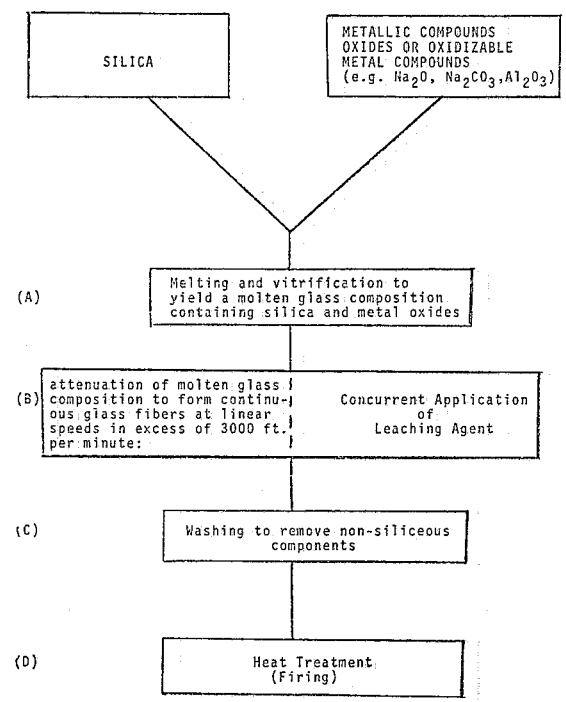

As shown in the above process diagram, the inventive method comprises four major phases, i.e. the formation of a glass composition containing both siliceous and non-siliceous components; the simultaneous formation of continuous fibers from the glass composition and application of a leaching agent capable of preferentially dissolving the non-siliceous components; the separation of the non-siliceous components to leave a continuous silica fiber; and the thermal treatment of the silica fiber to improve its strength and moisture resistance.

Specifically, continuous glass fibers composed of silica and various glass forming metal oxides, are prepared by conventional fiber forming techniques, e.g. the high speed attenuation of molten streams of glass flowing through orifices in a glass melting furnace, and are immediately subjected to treatment with an aqueous acidic solution which removes non-siliceous materials and yields a continuous fiber formed of silica. This is shown by phases A and B of the process diagram. The conventional methods of fiber formation referred to are amply disclosed by the prior art, and generally comprise the flowing of molten glass through minute orifices located on the bottom surface of a receptacle for the molten glass, and the attenuation and packaging of the attenuated fibers by means of a high speed winder located beneath the minute orifices.

The glass fibers, which are attenuated at linear speeds in excess of 3,000 feet per minute, and normally between 10,000 to 15,000 feet per minute, may be sprayed with an acidic solution during such formation, and prior to being wound in a strand package form, as shown by phase B of the process diagram. During such treatment, a metal silicate gel, e.g. sodium silicate, is formed, and the acidic solution is employed in a quantity calculated to both dissolve the nonsiliceous components from the glass fibers and to neutralize the soluble alkaline ions, e.g. sodium oxide, which are removed or extracted by leaching. Accordingly, the acidic concentration of the treating solution is designed to maintain the pH on the acidic side, and is based upon the potential source of alkali ion in the composition of the glass which is treated. Specifically, the acid is employed in an equimolar ratio to the alkali ion. By alkali ion, the ions of Group I-A and II-A metals are intended since it is these materials which affect the hydrogen ion concentration. For example, if the glass being treated contains 15 percent sodium oxide, 10 percent of the acid would be used since only two thirds of the sodium oxide is composed of the sodium ion. Somewhat of an exception to this rule arises in the case of aluminum borosilicate glasses. In respect to such compositions, the alkali ion concentration is lower but such ions are difficult to remove since their removal must also be attended by the removal of the aluminum and boron ions. Consequently, higher acid concentrations and temperatures are necessitated. Accordingly, the leaching agent is best defined as an acidic compositiion capable of reaction with the non-siliceous components of glass to produce salts, and present in a quantity adequate to maintain its acidity despite the release of ions of the Group I-A and Group II-A metals. In essence, the acid is present in a quantity which is at least equal to the quantity of potential Groups I-A and II-A metal ions which are present in the glass composition. The salts which are produced are in turn washed away by water.

Conventional inorganic and organic acids which exert a leaching effect upon glass may be employed, e.g. hydrochloric, sulfuric, nitric, acetic acids, etc. While sulfuric acid is generally preferred, hydrochloric acid is preferable in the case of aluminum borosilicate glasses as aluminum chloride is more soluble than the sulfate, and consequently easier to remove after leaching. The essential property of the acids employed may be defined as their ability to preferentially remove non-siliceous components of the glass while permitting the silica component to remain in a relatively undisturbed condition, as a skeletal continuous matrix.

Subsequent to the acid treatment and the winding of the treated strand into a package form, the soluble salts formed by leaching are removed by washing and the leached fibers are fired to reconstruct the molecular network and thereby increase their strength as shown by phases C and D of the process diagram. In the removal of the precipitated salts an additional acid treatment may be employed to further neutralize the leached residues, and the fibers may then be subjected to a water wash. In the case of fibers which are difficult to leach, e.g. aluminum borosilicate glass fibers, a more rigorous post-forming acid treatment may be employed, e.g. the use of hot acidic solutions of a higher acid concentration. The acidic solutions should be kept below 212° F.

While the firing of the fibers is preferably achieved at temperatures in excess of 1500° F., longer heat treatments are permissive at these temperatures since firing is the result of a time-temperature relationship.

Subsequent to the leaching of the fibers, additional treatments and/or safeguards may be utilized in order to preserve the properties of the strand or to impart more desirable properties for specific end uses. For example, if a protective coating is not applied to the fibers, it is advisable to store them under relatively moisture free conditions, e.g. in a sealed polyethylene bag, since moisture may degrade the fibers or impair their end properties, e.g. dielectric properties. However, the moisture problem may be substantially diminished by the firing treatment, and even further diminished if the fiber is impregnated with a fluorine compound such as ammonium fluoride, prior to firing. It is theorized that such fluorine compounds displace the OH radicals and the firings closes the absorptive pores of the fiber during such exclusion of the moisture and prior to its re-absorption.

Even after the firing of the fibres, it is advisable to employ a protective coating such as wax, to guard against harmful effects of mutual abrasion and to preclude or curtail subsequent adsorption of moisture. Conventional plant, animal, mineral or synthetic waxes or waxy materials, such as beeswax, myrtle wax, paraffin, fatty acids, e.g. stearic acid, mono and polyhydroxy alcohols, and the like, may be employed as the protective medium. Also desirable are cationic, hydrophobic lubricants such as amine-fatty acid condensates or chromium complexes, e.g. tetraethylene pentamine distearate, octadecyl amine acetate, methacrylato chromic chloride, etc. When the strands are to be employed in an end use in which both protection and lubricity are desirable, such as weaving, a combination of materials, e.g. paraffin and methacrylato chromic chloride, may be employed. Other film forming additives may also be combined. In such case, subsequent exposure to heat will dispel such coatings without damage to the thermally resistant silica fibers, and such heat treatment may be contrived or native to the environment of use.

The foregoing coatings may be applied to the leached strands while they are in the package, as by vacuum impregnation, or may be applied while the strand is being withdrawn from the package for further processing such as twisting, plying, roving formation, etc.

A preferred method and materials for the preparation of silica fibers is provided by the following example:

*Example 1*

Fibers were prepared by flowing a molten mass of the following ingredients through minute orifices and attenuating the molten streams into minute filaments having an average diameter of less than 0.0006 inch:

| Composition: | Percent by weight |
|---|---|
| $SiO_2$ | 69.6 |
| $Na_2SO_4$ | 2.0 |
| $Na_2CO_3$ | 28.4 |

In the melting of the above batch composition, the sulfates and carbonates are vaporized and dispelled to yield fibers comprising approximately 80 percent by weight of silica and 20 percent by weight of sodium oxide. In view of the high silica content and low flux ratio, the batch is melted in a platinum furnace at temperatures of between 2700–2800° F. and is introduced to the fiber forming bushing tip at temperatures in the area of 2300–2400° F.

The above formulation is highly suited to the present invention in that it yields glass fibers having a high silica content and free from boron and alumina. Since 20 percent sodium oxide is present, the acid applied at forming was applied in a ratio of 14 percent since only two-thirds of the sodium oxide is productive of the sodium ion.

2,040 of the above described fibers are pulled from the bushing at a linear speed of approximately 4,500 feet per minute and are sprayed with a 15 percent aqueous solution of sulfuric acid by any of the methods and apparatus disclosed in U.S. Patents 2,491,889, 2,846,348, and 2,906,470 with the spray contacting the glass fibers approximately 3 feet below the orifices from which the glass fibers were drawn and attenuated. At approximately 10 feet from the spray applicator, the fibers are drawn together into a strand and coiled into a package by apparatus of the type shown in the Klink, Belue, and Sears application, Ser. No. 455,866, filed May 14, 1965, in which the tension is maintained below 10 ounces and a uniform cross-over angle of 15 degrees is used. This produces a package substantially as shown in the Klink et al. application.

Subsequently, the wound package of treated fibers was immersed in a bath of a 5 percent solution of sulfuric acid for a period of 30 minutes, for the purpose of removing the salts which were formed by leaching.

Following the acid immersion, the fibers were immersed in water for a final wash of 20 minutes. Prior to the water wash, it is beneficial to encase the package in a protective "sock," such as a cotton sleeve, since the fibers are extremely weak at this phase.

The leached and washed fibers were then oven treated at 1700° F. for a period of 8 hours.

The basic glass batch may also be formulated to utilize or include metallic fluxes or glass formers, or combinations of such compounds, in place of the sodium oxide of the fibers yielded by Example 1. One example of such a formulation is provided by Example 2 below:

*Example 2*

| Composition: | Percent by weight |
|---|---|
| $SiO_2$ | 72.7 |
| $Al_2O_3$ | 2.0 |
| $CaO$ | 5.6 |
| $MgO$ | 3.4 |
| $Na_2O$ | 15.6 |
| $K_2O$ | 0.3 |
| $Fe_2O_3$ | 0.4 |

The fibers formed from the above batch composition were treated as in Example 1 with the exception that a 15 percent aqueous solution of hydrochloric acid was utilized in order to avoid the formation of calcium sulfate due to the presence of calcium oxide in the glass formulation.

As previously stated, the fibers may be treated with various protective, lubricating, etc., materials either before or after firing and prior or subsequent to removal from the wound package. In the absence of such protective coatings, it is advisable to protect the fibers from moisture or atmospheric impurities, for example by storage in a polyethylene bag.

If the fibers are to be employed in a discontinuous form, e.g. chopped to form a random mat, they may be chopped upon the package. Alternatively, they may be wound upon a tube which is soluble in the acid wash and removed as a random choppable mass from the bath. However, acid resistant tubes, e.g. polyethylene, may be used and decomposed by the heat treatment.

As previously discussed, the utilization of different glass compositions may entail certain alterations or modifications in the process. For example, when an aluminum borosilicate glass such as E glass is used, both treatment and the treating materials are preferably changed. Specifically, the acid spray may comprise a 20 percent solution of hydrochloric acid and the acid bath is preferably a boiling, 20 percent solution of HCl. This is due to the impeding effect of alumina and boron upon the lower concentration of alkali ion, and the inferior solubility of aluminum sulfate.

The silica fibers derived by the present invention are of great value in high temperature, high strength applications. In such applications, silica fibers now compete with refractory metal alloys and the so-called "super" alloys. Such condition exists, despite the somewhat inferior temperature-strength properties of the silica fibers, because of the fact that the alloy and refractory metal fibers are expensive due to their inability to be formed by conventional fiber forming methods.

However, in an ancillary embodiment of the present invention, fibers having temperature-strength properties comparable to refractory metal and super alloys, may be prepared by conventional fiber forming methods.

Such improved fibers are prepared by leaching a conventional glass fiber to obtain a silica fiber, and "impregnating" the fiber with a metal to yield a metallosilica fiber having excellent strengths at high temperatures.

The inventive processes for transforming the silica fibers to metallo-silica fibers, may be demonstrated by the following process diagram:

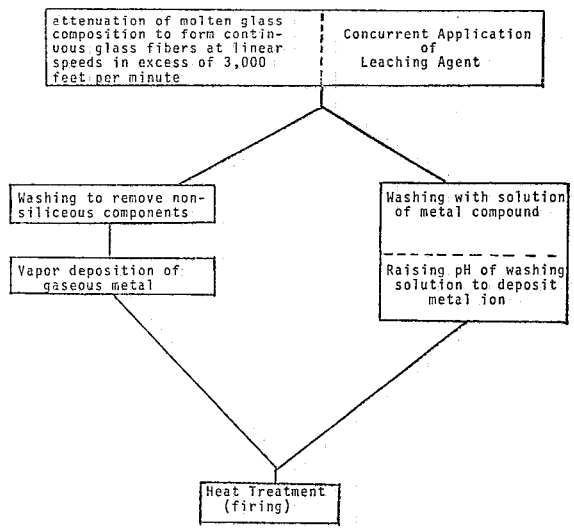

One method of preparing the metallo-silica fibers comprises the vapor deposition or gaseous metal coating of the leached, silica fibers. One such technique is described in the following example:

*Example 3*

Silica fibers prepared in accordance with Example 1, were placed in a closed chamber at atmospheric pressure and temperature. A gaseous mixture of equal parts of nickel carbonyl and hydrogen was introduced at a temperature of 150° F. When the nickel compound was found to be emitting from an overhead exit tube leading to an aspirator, the chamber was sealed and heated to 400° F. for one hour. The nickel impregnated fibers were then removed and subjected to firing at 1800° F. In place of nickel carbonyl, other gaseous carbonyls may also be utilized, e.g. iron pentacarbonyl.

Another method of metal impregnation is set forth in the following example:

*Example 4*

The method of Example 1 was repeated with the following modification of the water wash. To the water wash employed after the acid wash, was added 2 percent by weight of zirconium nitrate. After providing time for the absorption of zirconia on the surface of the silica fibers, the pH was raised to 8 through the addition of ammonium hydroxide. The treated silica fibers were then removed and fired and 2000° F. for 45 minutes. In place of the zirconium nitrate, other metallic compounds may also be employed, e.g. zirconium chloride, potassium nitrate, etc.

It will be noted that in the above-described procedure, the individual glass fibers are wetted with an aqueous solution that is devoid of both film-forming and lubricant material prior to the time that the individual filaments are drawn together into a strand.

By way of contrast, the prior art has always thought it necessary to coat the individual filaments with a film-former such as starch or a plastic to hold the fibers separated when they are coiled into a package. In addition, the art has found it necessary to use both non-ionic and cationic lubricants to lubricate the fibers while they are being drawn over relatively stationary guide surfaces, particularly when the fibers are in a wet condition, and prior to the time that the film-former has set. The problem of abrasion of the individual filaments when brought together is, indeed, a serious one, and the fibers could not be gathered and wound into a coiled package using conventional techniques without the use of these film-formers and lubricants.

The prior art has not been able to leach conventional packages in which the individual filament are coated with film-forming lubricant materials. The filaments have broken into short pieces, and examination by ripping the package apart has shown that the fibers in some areas of the package were not broken and were not leached. The prior art has not known why the fibers in some areas of the package have not been leached. It has been generally concluded, therefore, that it was impossible to establish a uniform flow of leaching fluid through coiled packages.

According to the invention, applicant has found that it is possible to leach fibers when in a coiled package provided that film-forming and lubricant materials are not used, and provided that the filaments are wound into a package at unconventionally low speeds and low tensions, using an unconventionally high crossover angle of the fibers. It has been found that not only do the filaments not break after being leached, but that the coils in all of the regions of the package are leached uniformly. The prior art has not known why prior art packages could not be leached uniformly, but it is now presumed that channeling is produced by reason of film-forming materials. It will be understood that a package cannot be unwrapped to determine the precise nature of the difficulty, because of the extremely fragile nature of the leached fibers which break immediately upon being disturbed, until they are subjected to temperatures which reconstitute the molecular network. For this reason, the prior art has never known why failure occurred, and this has led to the general belief that glass fibers could not be uniformly leached in a coiled package.

Using hindsight, it is believed that attempts to remove film-forming materials, such as starch and plastics, from the package have caused some molecules of the film-formers and/or lubricants that have been attached to the glass and which contain an ionic end group, to reorient themselves on the surface of other film-forming material with the organic end of the molecule absorbed into the film-forming material and the ionic end group of the molecule projecting from the surface. This has the effect of both attracting water to the surface, and preventing this water from proceeding inwardly to dislodge the remainder of the film-forming material. The net effect is to insolubilize the remaining film-forming material and thus produces channeling.

In addition, upon leaching of the fibers, silicates are caught up by the film-forming materials to fortify the remaining film-forming materials and further prevent their removal. In addition, it has now been determined that the packages should not dry out after forming, since air that becomes attached to the surface of the glass is not removed from the package whereas air that is separated from the glass by films of water can be removed from the package. Once channeling has started for whatever reason, these channels become more firmly established by the leaching fluids.

It is not necessary in all instances, that the water which is applied to the individual filaments prior to their being drawn together into a strand be strongly acid, so long as they do not include a film-former. In some instances, the water can have a pH of 7, or thereabouts, and may also include a wetting agent. According to the present invention, however, it is necessary that each of the filaments be completely coated with water prior to their being drawn together into a strand, and it is necessary that these strands thereafter be kept wet in order that air will not adhere to the surface of the glass and thereby produce channeling. It has been found that if the fibers are completely wetted with water when formed, and kept wet prior to being immersed in an aqueous bath, the air that is contained within the package can be removed with a gentle flow of liquid. Once air that is not attached to the surface of the glass is removed, the leaching operation can be carried out under conditions wherein the silicates do not collect and produce channeling. Air in a package that is separated from the surface of the glass by a film of water can be removed from the package whereas air that is on the surface of the glass cannot be removed with any practical treatment.

The prior art has leached solid articles of glass having an appreciable thickness such as cookware, as well as chopped glass fibers, and has known that an open cell structure is produced, because it has been possible to leach thicknesses of glass up to approximately 1 inch. The open cell structure so produced, however, is very fragile, because the molecular structure is under an appreciable amount of strain, due to the removal of the metal atoms and the forces which they exert in the structure. It is necessary to physically treat the leached structures very gently and to raise the temperature of these structures slowly. When leached articles from which cookware is to be made, are heated to above 2000° F., the molecules of silica reorient themselves; and by reason of the internal strain, the articles shrink to about two-thirds of their previous unleached size. In those instances where this shrinkage has been prevented, the leached structure has disintegrated during the heating operation. Similarly glass fibers shrink when subjected to these conditions, it has been thought heretofore, that it is impossible to heat treat coils of leached fibers since they are restrained against shrinkage to a considerable degree. By preparing the packages as above-described using low speeds, low tension on the strand, and sufficient lead that the coils are not pulled down into a parallel relationship in the package but are caused to cross over each other at spaced apart points, a coiled package of leached fibers can be successfully heat treated without breakage of the fibers.

The coiled packages so produced will have uses in and of themselves because of their extremely large surface areas, which after heat treatment will be "active." The coiled packages are useful because they have a fixed shape and can be handled as in single piece, and they are also useful by reason of the fact that they are generally tubular in nature as produced. Because the structure is uniform and has been made in a manner wherein it is devoid of channels, uniform flow can be had through the package between its outer and inner cylindrical surfaces. The packages can be made of a size suitable for use in dryers and ion exchange equipment, such as is shown in the drawing wherein a coiled package in the form of a cartridge is installed in a casing. In addition, the pores in the fibers are much closer to the surface of the fibers then are the pores in particles of silica gel, so that a smaller volume of fibers than of silica gel can be used for some purposes.

The cartridge 10 shown in the drawing is generally cylindrically shaped and has an outside diameter of 6 inches, an inside diameter of 1½ inches, and a length of 12 inches. The cartridge 10 was produced according to the procedure outlined in Example 1, excepting that it was fired after leaching by raising its temperature gradually to 400° F. Thereafter it was held at this temperature for 2 hours followed by gradual cooling. This procedure drove off free moisture without destroying the porous nature of the fibers and made the cartridge suitable for absorbing moisture. While the cartridge 10 can be installed in various types of casings and used for various purposes, it is shown in the drawing as installed in a casing 12 of an air dryer.

The casing 12 comprises a section of 10 inch pipe 14 having a pipe cap 16 at its lower end. A pipe coupling 18 is provided at the bottom center of the pipe cap 16 and a hole 20 is provided through the cap for use as an inlet connection to the dryer. The upper end of the pipe section 14 has a diverging flanged section 20 thereon, for reasons which will later be explained, and the top flange 22 thereof has a flat sealing surface 24 for abutment by an O ring 26 that is supported in a recess 28 in a quick disconnect cover 30. The quick disconnect cover 30 has a plurality of downwardly extending fingers 32, and the flange 22 has a corresponding plurality of recesses 34 to receive the fingers 32 which allow the quick disconnect cover 30 to be installed axially upon the flange section 20 with the fingers 32 passing through the recesses 34. The bottom portion of the flange 22 has ramps 36 adjacent the recesses 34; and upon turning the quick disconnect cover 30, the fingers 32 are caused to ride downwardly over the ramps 36 to pull the cover 30 into tight engagement with the sealing surface 24 of the flange 22.

The quick disconnect cover 30 includes a tubular projection 40 of a shape to fit between the upper end of the cartridge 10 and the sidewall of the casing 12. A rubber sealing ring 42 of generally U-shaped cross section is slipped over the bottom end of the annular projection 40 to provide a seal between the cartridge 10 and the sidewalls of the casing 12. The sealing ring 42 includes inner and outer lips 44 and 46, which when pressure is exerted thereagainst, deflect against the sidewalls of the cartridge 10 and the casing 12 to effect a seal therewith. The tubular projection 40 is provided with an annular flange 48 for the purpose of abutting the top edge of the cartridge 10 and thereby hold the cartridge into firm engagement with a support 50 positioned in the bottom of the casing 12. The support 50 has a generally flat upper surface 52 and legs 54 by which it is supported from the bottom cap of the casing, and includes a centering projection 56 which assures that the lower end of the cartridge will, at all times, be properly positioned in the casing 12.

Before installation in the casing, a rubber cap 58 is slipped over the bottom end of the cartridge to effectively close off the bottom end of the cartridge and prevent fluid flow from the inlet 20 directly to the center passage 60 of the cartridge. The cap 58 may include an annular lip 62 on its outer edge to help retain the cap 58 during insertion into the casing 12, and also includes a center boss 64 which fits snugly into the lower end of the center passage 60. The boss 64 includes a recess 66 into which the centering projection 56 fits snugly, so that the lower end of the cartridge is secured against movement. An annular rubber cap 70 may also be provided on the upper end of the cartridge between the cartridge and the flange 48, and the tubular projection 40 is provided with a plurality of openings 72 therethrough to allow fluid flow from the central passage 60 to flow laterally through the openings 72 to the plenum 74 provided between the tapered walls of the flange section 20 and the tubular projection 40.

A pipe coupling 76 is welded to the outside of the flange section 20, and an opening 78 is provided through the flange section to form the outlet connection for the casing. The casing 12 may be made of any suitable material, and in the embodiment shown, is made of steel that has glass lining 80 on the inside and over the top surface of the flange 22 to form the sealing surface 24.

After isertion of the cartridge 10 into the casing 12 as above-described, the rubber sealing ring 42 is inserted on the lower end of the tubular projection 40, and the quick disconnect cover 30 is lowered axially into position over the top end of the cartridge. It will be seen that the tapered surfaces of the flange 20 allow the outer lip 46 to be centered and guided, and the subsequent turning of the cap when tightened into position, allows the legs 44 and 46 to assume a natural sealing position. The structure so far described is intended for use as an air dryer, but it will be seen that it can also be used as an absorption unit. When a properly prepared ion exchange cartridge is installed, it can also be used as an ion exchange unit for softening water and the like.

Ion exchange cartridges can be made in various ways provided that the sidewalls of the pores contain separable sodium or potassium ions. In a preferred procedure, a properly leached package, after being washed and while still wet, is subjected to a penetrating flow of a sodium bicarbonate solution until the sodium bicarbonate has penetrated the pores of the glass. Thereafter the cartridge is removed from the sodium bicarbonate bath, is washed and is dried above approximately 200° F.

*Example 5*

A cartridge of the size above-described is prepared according to the procedure of Example 1 to provide a structure of high porosity and large surface area. A 5 percent solution of sodium bicarbonate is caused to flow through the cartridge under a slight pressure by being pumped down through the central opening and outwardly through the glass fibers until the concentration of sodium bicarbonate in the effluent is substantially the same as the entering fluid. The cartridge is drained of free liquid, washed with distilled water and dried in air at approximately 250° F. for 48 hours. The resulting cartridge has good ion exchange properties.

As stated above, it is also possible to treat leached packages of fibers with solutions of metals including those of groups 2 and 3 of the periodic table to at least partially fill the pores and form new glasses having high strengths and which are not deteriorated by moisture. Strengths of the glasses formed will depend upon the metal used, and in all instances, the leached fibers coated and impregnated with the salts of the metals should be fired at temperatures above 1500° F. and preferably in the range of 2000 to 2200° F. These temperatures will generally be below the melt temperature of the resulting glass, but is still high enough to cause a diffusion and reorientation of the molecules. When salts of these metals are caused to penetrate the pores, and the thus treated fibers are heated, less shrinkage of the fibers occurs than when the leached fibers are not treated with the metals and a new glass formed. These glasses will have melting temperatures considerably higher than the glass from which the leached fibers are made, and in many instances, such as when these metals include uranium, zirconium and titanium, could not be feasibly produced otherwise.

Inasmuch as the fibers of the package only touch each other at spaced apart points, and inasmuch as the fibers are not heated above their fusion point, it is possible to uncoil the fibers of the thus newly formed glass from the package without breaking the fibers. Immediately after being uncoiled from the package, however, they should be coated with a suitable lubricant such as starch, as is well-known in the art, before being processed further, as by twisting, beaming and weaving into the fabrics.

It is apparent that the present invention has provided new and unusual methods for the preparation of silica fibers and metallo-silica fibers, as well as novel metallo-silica fibers.

It is further obvious that various changes, alterations, and substitutions may be made in the methods and materials of the present invention without departing from the spirit of the invention as defined by the following claims.

I claim:

1. A process of producing improved glass fibers, comprising: wetting a plurality of glass filaments containing leachable material immediately at forming with water devoid of protective film forming materials, gathering the wetted glass filaments into a wetted strand, coiling the wetted strand into a package having layers of coils the coils of each layer of which do not parallelly engage each other and with the coils of one layer extending at an angle relative to the coils of adjacent layers, said gathering and cooling being performed at a sufficiently low speed, low filament tension, and high coil crossover angle to prevent substantially any filament breakage during gathering and coiling, maintaining the strands in a wetted condition and exposing the package while the coils are in a wetted condition to an acid solution for a sufficient length of time to remove the leachable materials from the fibers to form an open celled highly porous fibrous structure.

2. The process of claim 1 following which the package is dried and fired to at least approximately 1500° F. and wherein said speed, tension, and crossover angle also prevents substantially any breakage of the filaments during firing.

3. The process of claim 1 following which the package is treated with a material producing a cationic surface on the sidewalls of the cells when heated, and heating the package to produce porous fibers having a cationic surface on the sidewalls of the cells.

4. The process of claim 3 wherein a salt of a member of the group consisting of alkali metal salts are applied to the surface of the cells.

5. The process of claim 1 following which the package is treated with a salt of a refractory metal in a manner injecting the refractory metal salt into the cells of the fibers, and firing the package to a temperature below the fusion point of the fibers to form a glass with the refractory metal of the salt.

6. The process of claim 1 followed by the steps of: impregnating said porous fiber structure with a metal, and firing said impregnated fibers to a temperature above approximately 1500° F.

7. A method as claimed in claim 6 in which said metal is a gaseous metal and said impregnation is succeeded by the heating of said fibers at a temperature in excess of the melting point of said metal.

8. An unfired coiled package of porous glass fibers produced substantially in accordance with the method of claim 1.

9. A method as claimed in claim 6 in which said impregnation comprises: immersing said fibers in a solution of a metal compound which is capable of yielding the metal ion of said metal compound at a pH in excess of neutrality, raising the pH of said solution to a pH of greater than 7 to precipitate said metal ion upon said fibers, and heating said fibers.

References Cited

UNITED STATES PATENTS

| 2,401,537 | 6/1946 | Adams | 117—54 |
| 2,768,944 | 10/1956 | Meth | 117—35 |
| 2,881,094 | 4/1959 | Hoover | 117—107 |
| 2,947,489 | 8/1960 | Russell | 65—11 |
| 3,086,902 | 4/1963 | Mager | 117—126 |
| 3,092,531 | 6/1963 | Labino | 156—24 |
| 3,125,476 | 3/1964 | Anderson | 65—31 |

FOREIGN PATENTS 824,972   12/1959   Great Britain.

DONALL H. SYLVESTER, *Primary Examiner.*

G. R. MYERS, *Assistant Examiner.*